United States Patent
Hirakawa et al.

(10) Patent No.: US 10,913,848 B2
(45) Date of Patent: Feb. 9, 2021

(54) POLYCARBONATE RESIN COMPOSITION AND OPTICAL LENS USING SAME

(71) Applicant: MITSUBISHI GAS CHEMICAL COMPANY, INC., Tokyo (JP)

(72) Inventors: Manabu Hirakawa, Kanagawa (JP); Yuta Nakanishi, Niigata (JP); Noriyuki Kato, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 22 days.

(21) Appl. No.: 16/488,765

(22) PCT Filed: Mar. 26, 2018

(86) PCT No.: PCT/JP2018/012100
§ 371 (c)(1),
(2) Date: Aug. 26, 2019

(87) PCT Pub. No.: WO2018/181157
PCT Pub. Date: Oct. 4, 2018

(65) Prior Publication Data
US 2020/0224025 A1    Jul. 16, 2020

(30) Foreign Application Priority Data

Mar. 31, 2017  (JP) .................... 2017-071415

(51) Int. Cl.
*C08L 69/00*  (2006.01)
*C08G 64/02*  (2006.01)
*C08G 64/16*  (2006.01)
*G02B 1/04*  (2006.01)

(52) U.S. Cl.
CPC .......... *C08L 69/00* (2013.01); *C08G 64/0208* (2013.01); *C08G 64/1691* (2013.01); *G02B 1/041* (2013.01); *C08L 2205/02* (2013.01); *C08L 2205/025* (2013.01)

(58) Field of Classification Search
None
See application file for complete search history.

(56) References Cited

U.S. PATENT DOCUMENTS

| | | |
|---|---|---|
| 7,198,830 B2 | 4/2007 | Fujimori et al. |
| 2010/0048855 A1 | 2/2010 | Kato et al. |
| 2011/0201762 A1 | 8/2011 | Kato et al. |
| 2017/0044312 A1 | 2/2017 | Kato et al. |
| 2017/0276837 A1 | 9/2017 | Kato et al. |

FOREIGN PATENT DOCUMENTS

| | | |
|---|---|---|
| JP | 02-069520 | 3/1990 |
| JP | 05-070584 | 3/1993 |
| JP | 05-341124 | 12/1993 |
| JP | 2004-315747 | 11/2004 |
| JP | 2007-070392 | 3/2007 |
| JP | 2015-086265 | 5/2015 |
| WO | 2007/142149 | 12/2007 |
| WO | 2010/010703 | 1/2010 |
| WO | 2015/170691 | 11/2015 |
| WO | 2016/052370 | 4/2016 |

OTHER PUBLICATIONS

Official Communication issued in International Application No. PCT/JP2018/012100, dated Jun. 12, 2018.
Extended European Search Report dated Mar. 16, 2020 in EP Patent Application No. 18775094.8.

*Primary Examiner* — David J Buttner
(74) *Attorney, Agent, or Firm* — Greenblum & Bernstein, P.L.C.

(57) ABSTRACT

Provided is a polycarbonate resin composition containing polycarbonate resin (A) having structural units represented by general formula (1) and polycarbonate resin (B) having a structural unit represented by general formula (2):

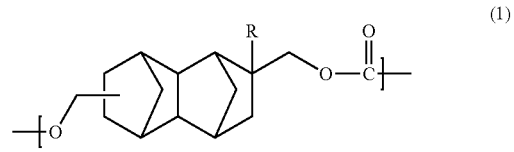

(in general formula (1), R represents a hydrogen atom or $C_1$-$C_4$ alkyl group);

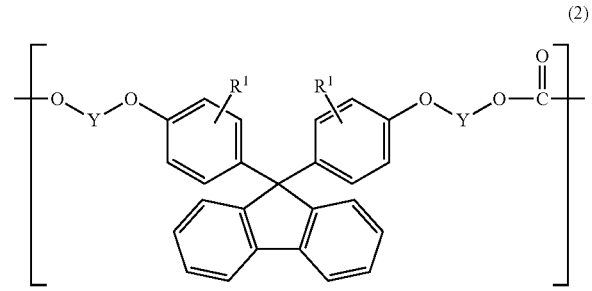

(in general formula (2), $R^1$ and $R^2$ each independently represent a hydrogen atom, $C_1$-$C_{20}$ alkyl group, $C_1$-$C_{20}$ alkoxyl group, $C_5$-$C_{20}$ cycloalkyl group, $C_5$-$C_{20}$ cycloalkoxyl group, $C_6$-$C_{20}$ aryl group or $C_6$-$C_{20}$ aryloxy group, and Y represents a $C_1$-$C_4$ alkylene group.)

9 Claims, 1 Drawing Sheet

POLYCARBONATE RESIN COMPOSITION AND OPTICAL LENS USING SAME

TECHNICAL FIELD

The present invention relates to a novel polycarbonate resin composition, and an optical lens made of the same.

BACKGROUND ART

As an optical element material used in optical systems of various cameras such as cameras, film-integrated cameras and video cameras, optical glass or an optically-applicable transparent resin has been used. Although optical glass is excellent in heat resistance, transparency, dimensional stability, chemical resistance and the like and is available in various types as materials with various refractive indices (nD) and Abbe numbers (νD), it has problems of high material cost, poor formability and low productivity. In particular, processing optical glass into an aspheric lens used for aberration correction requires highly advanced technique and high cost, which have been obstacles for practical use.

Meanwhile, optically-applicable transparent resins, especially thermoplastic transparent resins, can be used for mass-producing optical lenses by injection molding and are further advantageous in that they can easily be produced into aspheric lenses, and thus they are currently used for application to camera lenses. Examples of such a resin include polycarbonate made from bisphenol A, polystyrene, poly-4-methylpentene, polymethyl methacrylate and amorphous polyolefin.

If, however, an optically-applicable transparent resin is used for an optical lens which requires transparency, heat resistance and low birefringence property in addition to suitable refractive index and Abbe number, it may be disadvantageous in that its usage may be limited depending on the characteristic balance of the resin. For example, polystyrene has low heat resistance and large birefringence, poly-4-methylpentene has low heat resistance, and polymethyl methacrylate has low glass transition temperature, low heat resistance and small refractive index and thus their usage ranges are limited. Since polycarbonate made from bisphenol A has disadvantages such as large birefringence, its usage range is limited.

For optically designing an optical unit, a method for correcting chromatic aberration by use of a combination of multiple lenses having different Abbe numbers is known. For example, a lens made of a cycloolefin resin having a relatively high Abbe number may be combined with a lens made of a polycarbonate resin made from bisphenol A with a low Abbe number so as to correct chromatic aberration. The cycloolefin resin and the polycarbonate resin, however, have different coefficients of hygroscopic expansion. Therefore, when both lenses are combined to form a lens unit, the sizes of the lenses will differ upon water absorption under a usage environment of a smartphone or the like. This difference in the coefficients of expansion will impair the performance of the lenses.

Patent documents 1-3 describe polycarbonate copolymers comprising a perhydroxy dimethanonaphthalene skeleton. Since, however, the dihydroxymethyl groups are positioned at 2,3-positions in each case, they are poor in strength and thus are not suitable for optical lens application.

Patent document 4 discloses a polycarbonate resin that uses decahydro-1,4:5,8-dimethanonaphthalene diol (D-NDM) as a raw material, for the purpose of providing a resin having a high Abbe number and a small difference in the coefficient of hygroscopic expansion from a polycarbonate resin having a high refractive index and a low Abbe number. The resin of Patent document 4, however, requires improvement in hue (YI) and haze (Hz).

PRIOR ART DOCUMENTS

Patent Documents

Patent document 1: Japanese Unexamined Patent Application Publication No. Heisei 5-70584

Patent document 2: Japanese Unexamined Patent Application Publication No. Heisei 2-69520

Patent document 3: Japanese Unexamined Patent Application Publication No. Heisei 5-341124

Patent document 4: International Patent Application Publication No. 2016/052370A1

SUMMARY OF THE INVENTION

Problems to be Solved by the Invention

The problem to be solved by the present invention is to provide a polycarbonate resin composition having a low birefringence index, a moderate refractive index and a moderate Abbe number without deteriorating hue (YI) and haze (Hz), and to provide an optical lens formed from said resin composition. Herein, haze will also be referred to as Hz.

Means for Solving the Problems

Conventionally, blending a low refractive index material with a high refractive index material had a problem of poor transmittance. The present inventors, however, have gone through extensive investigation to solve the above-described problem and as a result of which found that when a polycarbonate resin (A) with a specific structure is kneaded with a polycarbonate resin (B) with a specific structure, both resins will be compatible with each other and will give a material with a controlled refractive index without deteriorating hue (YI) or haze (Hz), thereby accomplishing the present invention.

Thus, the above-described problem can be solved with a polycarbonate resin composition characterized below and an optical lens using the same.

<1> A polycarbonate resin composition comprising a polycarbonate resin (A) having a structural unit represented by General formula (1) below and a polycarbonate resin (B) having a structural unit represented by General formula (2) below:

(in General formula (1), R represents a hydrogen atom or a $C_1$-$C_4$ alkyl group)

(in General formula (2), $R^1$ and $R^2$ each independently represent a hydrogen atom, a $C_1$-$C_{20}$ alkyl group, a $C_1$-$C_{20}$ alkoxyl group, a $C_5$-$C_{20}$ cycloalkyl group, a $C_5$-$C_{20}$ cycloalkoxyl group, a $C_6$-$C_{20}$ aryl group or a $C_6$-$C_{20}$ aryloxy group, and Y represents a $C_1$-$C_4$ alkylene group).

<2> The polycarbonate resin composition according to <1> above, wherein $R^1$ and $R^2$ in General formula (2) each independently represent a hydrogen atom or a phenyl group.

<3> The polycarbonate resin composition according to <1> or <2> above, wherein the polycarbonate resin (A) and the polycarbonate resin (B) are made to be compatible with each other.

<4> The polycarbonate resin composition according to any one of <1> to <3> above, wherein the haze is 0.4% or less when measured with a thickness of 3 mm <5> The polycarbonate resin composition according to any one of <1> to <4> above, wherein the polycarbonate resin (A) comprises a structural unit derived from a 2,6-isomer represented by a structural formula below and a structural unit derived from a 2,7-isomer represented by a structural formula below <6> The polycarbonate resin composition according to <5> above, wherein the polycarbonate resin (A) comprises the structural unit derived from the 2,6-isomer and the structural unit derived from the 2,7-isomer at a mass ratio of 1.0:99.0 to 99.0:1.0.

<7> The polycarbonate resin composition according to any one of <1> to <6> above, wherein R in General formula (I) represents a hydrogen atom.

<8> The polycarbonate resin composition according to any one of <1> to <7> above, wherein the mixed ratio of the polycarbonate resin (A) and the polycarbonate resin (B) is 90:10 to 10:90 at a mass ratio.

<9> An optical lens using the polycarbonate resin composition according to any one of <1> to <8> above.

Advantageous Effect of the Invention

The present invention can provide a polycarbonate resin composition having a low birefringence index, a moderate refractive index and a moderate Abbe number without deteriorating hue (YI) and haze (Hz), and an optical lens using the same.

EMBODIMENTS FOR CARRYING OUT THE INVENTION

Hereinafter, modes for carrying out the present invention will be described in detail, although the present invention should not be limited thereto and may be modified in various ways without departing from the scope of the present invention.

Polycarbonate Resin (A)

A polycarbonate resin (A) according to the present invention has a structural unit represented by General formula (1) below.

in General formula (1), R represents a hydrogen atom or a $C_1$-$C_4$ alkyl group, preferably a hydrogen atom, a methyl group or an ethyl group, and particularly preferably a hydrogen atom.

Examples of the structural unit represented by General formula (1) (hereinafter, referred to as "structural unit (K)") include structural units derived from a dihydroxy compound represented by General formula (L) below. For example, it is a structural unit derived from decahydro-1,4:5,8-dimethanonaphthalene diol (hereinafter, sometimes referred to as "D-NDM").

(in General formula (L), R represents a hydrogen atom or a $C_1$-$C_4$ alkyl group).

The structural unit (K) is preferably a mixture of an isomer having a —$CH_2O$— group at position 6 as represented by General formula (M) below (2,6-isomer) and an isomer having a —$CH_2O$— group at position 7 as represented by General formula (N) below (2,7-isomer). From the viewpoints of the physical properties of the resin such as the strength, tensile elongation, appearance of the molded body and the like, it is preferably 2,6-isomer:2,7-isomer=1.0:99.0 to 99.0:1.0, more preferably 2,6-isomer:2,7-isomer=20:80 to 80:20, and particularly preferably 2,6-isomer:2,7-isomer=50:50 to 80:20 in a mass ratio. According to the present invention, a 2,3-isomer is preferably not included.

(in General formula (M), R represents a hydrogen atom or a $C_1$-$C_4$ alkyl group)

(in General formula (N), R represents a hydrogen atom or a $C_1$-$C_4$ alkyl group).

As the structural unit represented by General formula (M) above (hereinafter, referred to as a "structural unit (M)"), a structural unit derived from a dihydroxy compound represented by General formula (O) below may be exemplified. As the structural unit represented by General formula (N) above (hereinafter, referred to as a "structural unit (N)"), a structural unit derived from a dihydroxy compound represented by General formula (P) below may be exemplified.

(in General formula (O), R represents a hydrogen atom or a $C_1$-$C_4$ alkyl group)

(in General formula (P), R represents a hydrogen atom or a $C_1$-$C_4$ alkyl group).

In General formula (K), (L), (M), (N), (O) and (P), R is preferably identical in all of them, and R preferably represents a hydrogen atom in terms of availability.

While the polycarbonate resin (A) of the present invention has the structural unit represented by General formula (1) above, it may contain other structural unit as long as the effect of the present invention is not impaired. The proportion of the structural unit (K) in the polycarbonate resin (A) of the present invention is preferably 70 mass % or more and more preferably 100 mass %.

Other structural unit that may be contained in the polycarbonate resin (A) of the present invention refers to a structural unit obtained by reacting a diol compound other than that represented by General formula (1) with a carbonate diester, where examples of the diol compound other than that represented by General formula (1) include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC and bisphenol Z.

Polycarbonate Resin (B)

The polycarbonate resin (B) of the present invention has a structural unit represented by General formula (2) below.

in General formula (2), $R^1$ and $R^2$ each independently represent a hydrogen atom, a $C_1$-$C_{20}$ alkyl group, a $C_1$-$C_{20}$ alkoxyl group, a $C_5$-$C_{20}$ cycloalkyl group, a $C_5$-$C_{20}$ cycloalkoxyl group, a $C_6$-$C_{20}$ aryl group or a $C_6$-$C_{20}$ aryloxy group, preferably a hydrogen atom, a methyl group or a phenyl group, and more preferably a hydrogen atom or a phenyl group.

In General formula (2), Y represents a $C_1$-$C_4$ alkylene group, preferably an ethylene group or a propylene group, and more preferably an ethylene group.

As the structural unit represented by General formula (2), a structural unit derived from a dihydroxy compound represented by General formula (Q) below may be exemplified.

(in General formula (Q), $R^1$, $R^2$ and Y are the same as those in General formula (2)).

Specific examples of a fluorene-based diol compound represented by General formula (Q) include 9,9-bis(4-hydroxyphenyl)fluorene, 9,9-bis(4-hydroxy-3-methylphenyl)fluorene, 9,9-bis(4-hydroxy-3-tert-butylphenyl)fluorene, 9,9-bis(4-hydroxy-3-isopropylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)

fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene and 9,9-bis(4-(2-hydroxyethoxy)-3-phenylphenyl)fluorene. Among them, 9,9-bis(4-(2-hydroxyethoxy)phenyl)fluorene (BPEF), 9,9-bis(4-(2-hydroxyethoxy)-3-phenylphenyl)fluorene (BPPEF) and 9,9-bis(4-(2-hydroxyethoxy)-3-methylphenyl)fluorene (BPMEF) are favorable, and 9,9-bis(4-(2-hydroxyethoxy)phenyl)fluorene (BPEF) and 9,9-bis(4-(2-hydroxyethoxy)-3-phenylphenyl)fluorene (BPPEF) are more favorable.

While the polycarbonate resin (B) of the present invention has the structural unit represented by General formula (2) above, it may contain other structural unit as long as the effect of the present invention is not impaired. The proportion of the structural unit represented by General formula (2) above in the polycarbonate resin (B) of the present invention is preferably 70 mass % or more and more preferably 100 mass %.

Other structural unit that may be contained in the polycarbonate resin (B) of the present invention refers to a structural unit obtained by reacting a diol compound other than that represented by General formula (2) with a carbonate diester, where examples of the diol compound other than that represented by General formula (2) include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC and bisphenol Z.

Polycarbonate Resin Composition

The polycarbonate resin composition of the present invention comprises the polycarbonate resin (A) having the structural unit represented by General formula (1) above and the polycarbonate resin (B) having the structural unit represented by General formula (2) above.

The polycarbonate resin composition of the present invention may comprise other resin as long as the effect of the present invention is not impaired. The total proportion of the polycarbonate resin (A) and the polycarbonate resin (B) in the polycarbonate resin composition of the present invention is preferably 70 mass % or more, and more preferably 100 mass %.

The mixed ratio of the polycarbonate resin (A) and the polycarbonate resin (B) in the polycarbonate resin composition of the present invention is preferably 90:10 to 10:90, more preferably 90:10-50:50, still more preferably 90:10-60:40 and particularly preferably 80:20-60:40 in a mass ratio.

Furthermore, the polycarbonate resin of the present invention is preferably added with an antioxidant, a mold release agent, a processing stabilizer, an ultraviolent absorber, a fluidity improving agent, a crystal nucleating agent, a reinforcing agent, a dye, an antistatic agent, an antibacterial agent or the like Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N'-Hexamethylene-bis(3,5-di-tert-butyl)-4-hydroxy hydrocinnamamide), 3,5-di-tert-butyl-4-hydroxy-benzyl phosphonate-diethyl ester, tris(3,5-di-tert-butyl-4-hydroxybenzyl)isocyanurate and 3,9-bis{1,1-dimethyl-2-[β-(3-tert-butyl-4-hydroxy-5-methylphenyl)propionyloxy]ethyl}-2,4,8,10-tetraoxaspiro(5,5)undecane. Among them, pentaerythritol-tetrakis[3-(3,5-di-tert-butyl-4-hydroxyphenyl)propionate] is more favorable. The content of the antioxidant in the polycarbonate resin composition is 0.001-0.3 parts by weight with respect to a total of 100 parts by weight of the polycarbonate resins (A) and (B).

Preferably, the mold release agent contains 90 wt % or more of an ester resulting from an alcohol and a fatty acid. Specifically, examples of the ester resulting from an alcohol and a fatty acid include an ester resulting from a monohydric alcohol and a fatty acid, and a partial ester or a full ester resulting from a polyhydric alcohol and a fatty acid. The above-described ester resulting from a monohydric alcohol and a fatty acid is preferably an ester resulting from a monohydric alcohol having 1-20 carbon atoms and a saturated fatty acid having 10-30 carbon atoms. Moreover, the partial ester or the full ester resulting from a polyhydric alcohol and a fatty acid is preferably a partial ester or a full ester resulting from a polyhydric alcohol having 1-25 carbon atoms and a saturated fatty acid having 10-30 carbon atoms.

Specifically, examples of the ester resulting from a monohydric alcohol and a saturated fatty acid include stearyl stearate, palmityl palmitate, butyl stearate, methyl laurate and isopropyl palmitate. Examples of the partial ester or the full ester resulting from a polyhydric alcohol and a saturated fatty acid include a full ester or a partial ester of monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritol such as dipentaerythritol hexastearate. Among them, monoglyceride stearate and monoglyceride laurate are particularly favorable. The content of such a mold release agent is preferably in a range of 0.005-2.0 parts by weight, more preferably in a range of 0.01-0.6 parts by weight and still more preferably in a range of 0.02-0.5 parts by weight with respect to a total of 100 parts by weight of the polycarbonate resins (A) and (B).

Examples of the processing stabilizer include a phosphorus-based heat processing stabilizer and a sulfur-based heat processing stabilizer. Examples of the phosphorus-based heat processing stabilizer include phosphorous acid, phosphoric acid, phosphonous acid, phosphonic acid and esters thereof. Specific examples include triphenyl phosphite, tris(nonylphenyl)phosphite, tris(2,4-di-tert-butylphenyl)phosphite, tris(2,6-di-tert-butylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenypoctyl phosphite, bis(nonylphenyl) pentaerythritol diphosphite, bis(2,4-dicumyl phenyl) pentaerythritol diphosphite, bis(2,4-di-tert-butylphenyl) pentaerythritol diphosphite, distearyl pentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzene phosphonate, diethyl benzene phosphonate, dipropyl benzene phosphonate, tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, bis(2,4-di-tert-butylphenyl)-4-phenyl-phenyl phosphonite and bis(2,4-di-tert-butylphenyl)-3-phenyl-phenyl phosphonite. Among them, bis(2,6-di-tert-butyl-4-methylphenyl)pentaerythritol diphosphate is more favorable. The content of the phosphorus-based heat processing stabilizer in the polycarbonate resin composition is preferably 0.001-0.2 parts by weight with respect to a total of 100 parts by weight of the polycarbonate resins (A) and (B).

Examples of the sulfur-based heat processing stabilizer include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate and distearyl-3,3'-thiodipropionate. The content of the sulfur-based heat processing stabilizer in the polycarbonate resin composition is preferably 0.001-0.2 parts by weight with respect to a total of 100 parts by weight of the polycarbonate resins (A) and (B).

The ultraviolent absorber is preferably at least one ultraviolent absorber selected from the group consisting of a benzotriazole-based ultraviolent absorber, a benzophenone-based ultraviolent absorber, a triazine-based ultraviolent absorber, a cyclic iminoester-based ultraviolent absorber and a cyanoacrylate-based ultraviolent absorber. Specifically, the following ultraviolent absorbers may be used alone or two or more of them may be used in combination.

Examples of the benzotriazole-based ultraviolent absorber include 2-(2-hydroxy-5-methylphenyl)benzotriazole, 2-(2-hydroxy-5-tert-octylphenyl)benzotriazole, 2-(2-hydroxy-3,5-dicumyl phenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazole-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazine-4-one) and 2-[2-hydroxy-3-(3,4,5,6-tetrahydrophthalimide methyl)-5-methylphenyl]benzotriazole.

Examples of the benzophenone-based ultraviolent absorber include 2,4-dihydroxy benzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxy benzophenone, 2-hydroxy-4-methoxy-5-sulfoxy trihydrideratebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxy benzophenone, bis(5-benzoyl-4-hydroxy-2-methoxyphenyl)methane, 2-hydroxy-4-n-dodecyloxybenzophenone and 2-hydroxy-4-methoxy-2'-carboxy benzophenone.

Examples of the triazine-based ultraviolent absorber include 2-(4,6-diphenyl-1,3,5-triazine-2-yl)-5-[(hexyl)oxy]-phenol and 2-(4,6-bis(2,4-dimethylphenyl)-1,3,5-triazine-2-yl)-5-[(octyl)oxy]-phenol.

Examples of the cyclic iminoester-based ultraviolent absorber include 2,2'-bis(3,1-benzoxazine-4-one), 2,2'-p-phenylenebis(3,1-benzoxazine-4-one), 2,2'-m-phenylenebis(3,1-benzoxazine-4-one), 2,2'-(4,4'-diphenylene)bis(3,1-benzoxazine-4-one), naphthalene)bis(3,1-benzoxazine-4-one), 2,2'-(1,5-naphthalene)bis(3,1-benzoxazine-4-one), 2,2'-(2-methyl-p-phenylene)bis(3,1-benzoxazine-4-one), 2,2'-(2-nitro-p-phenylene)bis(3,1-benzoxazine-4-one) and 2,2'-(2-chloro-p-phenylene)bis(3,1-benzoxazine-4-one).

Examples of the cyanoacrylate-based ultraviolent absorber include 1,3-bis-[(2'-cyano-3',3'-diphenylacryloyDoxy]-2,2-bis[(2-cyano-3,3-diphenylacryloyDoxy]methyl) propane and 1,3-bis-[(2-cyano-3,3-diphenylacryloyDoxy] benzene.

The content of the ultraviolent absorber is preferably 0.01-3.0 parts by weight, more preferably 0.02-1.0 parts by weight and still more preferably 0.05-0.8 parts by weight with respect to a total of 100 parts by weight of the polycarbonate resins (A) and (B). As long as the blended amount is within the above-mentioned range, sufficient weather resistance can be imparted to the polycarbonate resin composition according to usage.

Phenol generated upon production and unreacted residual carbonate diester exist as impurities in the polycarbonate resin compound. The content of phenol in the polycarbonate resin composition is preferably 0.1-3000 ppm, more preferably 0.1-2000 ppm, and still more preferably 1-1000 ppm, 1-800 ppm, 1-500 ppm or 1-300 ppm. The content of the carbonate diester in the polycarbonate resin composition is preferably 0.1-1000 ppm, more preferably 0.1-500 ppm, and particularly preferably 1-100 ppm. The amounts of phenol and the carbonate diester contained in the polycarbonate resin composition can be adjusted to obtain a resin having physical properties of interest. The contents of phenol and the carbonate diester can suitably be adjusted by altering the polycondensation conditions or apparatus. They can also be adjusted by altering the conditions for the extruding step following the polycondensation.

If the content of phenol or the carbonate diester exceeds the above-mentioned range, problems such as deterioration of the strength of the resulting molded resin body or generation of odor may be caused. On the other hand, if the content of phenol or the carbonate diester falls below the above-described range, plasticity of the resin upon melting may possibly be deteriorated.

Method for Producing Polycarbonate Resin Composition

The method for producing the polycarbonate resin composition of the present invention is not particularly limited, and the composition may be produced, for example, by any of the following methods: (1) a method in which polycarbonate resins (A) and (B) in solid states are mixed and kneaded with a kneading machine; (2) a method in which a polycarbonate resin (A) in a molten state is added and kneaded with a polycarbonate resin (B) in a solid state; (3) a method in which a polycarbonate resin (B) in a molten state is added and kneaded with a polycarbonate resin (A) in a solid state; and (4) a method in which a polycarbonate resin (A) in a molten state and a polycarbonate resin (B) in a molten state are mixed and kneaded.

Kneading may be carried out in either a continuous or batch mode. The kneading machine is preferably an extruder in a case of a continuous mode, and Labo Plastomill or a kneader in a case of a batch mode.

The polycarbonate resin (A) of the present invention can be produced using a dihydroxy compound represented by General formula (L) and a carbonate diester as raw materials in a melt polycondensation process. In the dihydroxy compound represented by General formula (L), a mixture of isomers having hydroxymethyl groups at 2,6- and 2,7-positions is present. The mass ratio of these isomers is 2,6-isomer:2,7-isomer=0.1:99.9 to 99.9:0.1. The mass ratio is preferably 2,6-isomer:2,7-isomer=1.0:99.0 to 99.0:1.0, more preferably 2,6-isomer: 2,7-isomer=20:80 to 80:20, and particularly preferably 2,6-isomer:2,7-isomer=50:50 to 80:20 in terms of the physical properties of the resin such as resin strength, tensile elongation and appearance of the molded body. According to the present invention, a 2,3-isomer is preferably not contained. Moreover, other diol compound may be used in combination. Production can take place in the presence of a basic compound catalyst, a transesterification catalyst or a mixed catalyst containing both of them as a polycondensation catalyst for this reaction.

Meanwhile, the polycarbonate resin (B) of the present invention can be produced using a dihydroxy compound represented by General formula (Q) and a carbonate diester as raw materials in a melt polycondensation process.

Examples of the carbonate diester include diphenyl carbonate, ditolyl carbonate, bis(chlorophenyl)carbonate, m-cresyl carbonate, dimethyl carbonate, diethyl carbonate, dibutyl carbonate and dicyclohexyl carbonate. Among them, diphenyl carbonate is particularly preferable in terms of reactivity and purity. The carbonate diester is preferably used at a molar ratio of 0.97-1.20 and more preferably at a molar ratio of 0.98-1.10 per mole of the diol component. This molar ratio can be adjusted to control the molecular weight of the polycarbonate resin.

Examples of the basic compound catalyst include alkali metal compounds, alkaline earth metal compounds and nitrogen-containing compounds.

Examples of the alkali metal compound include organic acid salts, inorganic salts, oxides, hydroxides, hydrides and alkoxides of alkali metals. Specifically, sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, phenylated boron sodium, sodium benzoate, potassium benzoate, cesium benzoate, lithium benzoate, disodium hydrogen phosphate, dipotassium hydrogen phosphate, dilithium hydrogen phosphate, disodium phenyl phosphate, or a disodium salt, a dipotassium salt, a dicesium salt or a dilithium salt of bisphenol A, a sodium salt, a potassium salt, a cesium salt or a lithium salt of phenol, or the like can be used. Among them, sodium carbonate and sodium hydrogen carbonate are preferable in terms of catalytic effect, price, availability, influence on hue of the resin and the like.

Examples of the alkaline earth metal compound include organic acid salts, inorganic salts, oxides, hydroxides, hydrides or alkoxides of alkaline earth metal compounds. Specifically, magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, or the like can be used.

Examples of the nitrogen-containing compound include quaternary ammonium hydroxides and salts and amines thereof. Specifically, quaternary ammonium hydroxides having an alkyl group, an aryl group or the like, such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; bases or basic salts such as ammonia, tetramethylammonium borohydride, tetrabutylammonium borohydride, tetrabutylammonium tetraphenylborate and tetraphenylammonium tetraphenylborate; or the like can be used.

As the transesterification catalyst, a salt of zinc, tin, zirconium, lead or the like can preferably be used, where they may be used alone or in combination. It may also be used in combination with the above-mentioned alkali metal compound or alkaline earth metal compound.

Specifically, zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, lead (IV) acetate, or the like can be used as the transesterification catalyst.

These catalysts are preferably used at a molar ratio of $1 \times 10^{-9}$ to $1 \times 10^{-3}$, and more preferably at a molar ratio of $1 \times 10^{-7}$ to $1 \times 10^{-4}$ leper mole of the total dihydroxy compounds.

According to the melt polycondensation process, melt polycondensation is carried out by heating the above-described raw materials and catalyst under ambient or reduced pressure while removing side products through transesterification reaction. Generally, the reaction takes place through a multistage process that includes two or more stages.

Specifically, the first stage reaction is carried out at a temperature of 120-260° C., preferably 180-240° C., for 0.1-5 hours, preferably 0.5-3 hours. Then, the reaction temperature is increased while increasing the degree of pressure reduction of the reaction system so as to allow reaction between the diol compound and the carbonate diester, and eventually allowing polycondensation reaction under a reduced pressure of 1 mmHg or lower at a temperature of 200-350° C. for 0.05-2 hours. Such reaction can be carried out in either a continuous or batch mode. The reactor used for the reaction may be a vertical type reactor equipped with anchor-shaped stirring blades, Maxblend stirring blades, helical ribbon-shaped stirring blades or the like, a horizontal type reactor equipped with paddle blades, lattice blades, spectacle-shaped blades or the like, or an extruder type reactor equipped with a screw. In addition, these reactors are preferably used in a suitable combination according to the viscosity of the polymer.

According to the method for producing the polycarbonate resin (A) and the polycarbonate resin (B) of the present invention, the catalyst may be removed or deactivated after the polymerization reaction in order to retain heat stability and hydrolysis stability. Generally, the catalyst is preferably deactivated by a process of adding a known acidic substance. Specifically, as such a substance, an ester such as butyl benzoate; an aromatic sulfonic acid such as p-toluenesulfonic acid; an aromatic sulfonate ester such as butyl p-toluenesulfonic acid or hexyl p-toluenesulfonic acid; a phosphoric acid such as phosphorous acid, phosphoric acid or phosphonic acid; a phosphite ester such as triphenyl phosphite, monophenyl phosphite, diphenyl phosphite, diethyl phosphite, di-n-propyl phosphite, di-n-butyl phosphite, di-n-hexyl phosphite, dioctyl phosphite or monooctyl phosphite; a phosphate ester such as triphenyl phosphate, diphenyl phosphate, monophenyl phosphate, dibutyl phosphate, dioctyl phosphate or monooctyl phosphate; a phosphonic acid such as diphenyl phosphonate, dioctyl phosphonate or dibutyl phosphonate; a phosphonate ester such as diethyl phenyl phosphonate; a phosphine such as triphenyl phosphine or bis(diphenylphosphino)ethane; a boric acid such as boric acid or phenylboric acid; an aromatic sulfonic acid salt such as dodecylbenzene sulfonate-tetrabutyl phosphonium salt; an organic halide such as stearic acid chloride, benzoyl chloride or p-toluenesulfonic acid chloride; an alkyl sulfate such as dimethyl sulfate; an organic halide such as benzyl chloride; or the like can favorably be used. In terms of deactivation effect, hue and stability of the resin, it is preferable to use butyl p-toluenesulfonic acid. Furthermore, these deactivating agents are used in an amount of preferably 0.01-50 times mol and more preferably 0.3-20 times mol with respect to the amount of the catalyst. If the amount is less than 0.01 times mol the amount of the catalyst, the deactivation effect will be inadequate, which is unfavorable. On the other hand, if the amount is more than 50 times mol the amount of the catalyst, the heat resistance will be poor and the molded body will likely be susceptible to coloring, which are unfavorable.

Following deactivation of the catalyst, a step of devolatilizing and removing the low-boiling-point compound in the polymer under a pressure of 0.1-1 mmHg at a temperature of 200-350° C. may be provided. For this step, a horizontal-type device equipped with stirring blades that have excellent surface renewal capacity such as paddle blades, lattice blades, spectacle-shaped blades or the like, or a thin-film evaporator can favorably be used.

It is desirable that the content of the foreign matters in the polycarbonate resin composition of the present invention is as small as possible, and for which filtration of the molten raw materials, filtration of the catalyst solution or the like can favorably be performed. The mesh of the filter is preferably 5 µm or less and more preferably 1 µm or less. Moreover, the generated resin can favorably be filtrated with a polymer filter. The mesh of the polymer filter is preferably 100 µm or less and more preferably 30 µm or less. Needless to say, the step of collecting the resin pellets should be carried out in a low dust environment, which is preferably Class 1000 or lower and more preferably Class 100 or lower.

Physical Properties of Polycarbonate Resin Composition

The glass transition temperature (Tg) of the polycarbonate resin composition of the present invention is preferably 95-180° C., more preferably 100-160° C. and particularly preferably 105-155° C. The glass transition temperature (Tg) is preferably 110° C. and 120° C. at minimum and preferably 150° C. at maximum. Tg lower than 95° C. is unfavorable since the usage temperature range of a lens or a camera will be narrowed. On the other hand, Tg exceeding 180° C. is unfavorable since the molding conditions employed for injection molding become strict.

The refractive index of the polycarbonate resin composition of the present invention as measured according to the method of JIS-K-7142 after molding is preferably L50-1.61 and more preferably L53-1.60.

The Abbe number of the polycarbonate resin composition of the present invention as measured according to the method of JIS-K-7142 after molding is preferably 28.0 or higher, more preferably 30.0 or higher and particularly preferably 32.0 or higher. The Abbe number is preferably 60 and more preferably 50 at maximum.

The total light transmittance of the polycarbonate resin composition of the present invention as measured by integrating-sphere photoelectric photometry after molding into a molded body with a thickness of 3 mm is preferably 85.0% or more and more preferably 87.0% or more. The total light transmittance is about 99% at maximum.

The water absorption of the polycarbonate resin composition of the present invention as measured according to the method of JIS-K-7209 is preferably 0.2-2.0% and more preferably 0.3-1.5%.

The coefficient of hygroscopic expansion of the polycarbonate resin composition of the present invention is preferably 0.01-0.5% and more preferably 0.03-0.4%. The coefficient of hygroscopic expansion is measured with a micrometer (accuracy: $1/1000$ mm). The coefficient of hygroscopic expansion refers to the change (%) in the diameter of a disk that is used for the water absorption measurement before and after water absorption.

The weight-average molecular weight (Mw) of the polycarbonate resin composition of the present invention in terms of polystyrene is preferably 20,000-70,000. The weight-average molecular weight (Mw) in terms of polystyrene is more preferably 25,000-65,000 and particularly preferably 30,000-60,000. Mw less than 20,000 is unfavorable since the optical lens will be brittle. Mw greater than 70,000 is unfavorable since the melt viscosity will be increased and thus removal of the resin at the end of production becomes difficult, and further fluidity will be deteriorated which renders injection molding in a molten state difficult.

The melt flow rate (MVR) of the polycarbonate resin composition of the present invention is preferably 10 to 80 and more preferably 20-60.

The reduced viscosity ($\eta sp/C$) of the polycarbonate resin composition of the present invention is preferably 0.20 dl/g or more and more preferably 0.23-0.84 dl/g.

The hue (YI) of the polycarbonate resin composition of the present invention is preferably 5.0 or less, more preferably 3.5 or less, still more preferably 3.0 or less and particularly preferably 2.5 or less. The hue (YI) is 0.2 or more at minimum.

The haze (Hz) of the polycarbonate resin composition of the present invention when measured with a thickness of 3 min is preferably 0.4% or less, more preferably 0.3% or less, still more preferably 0.2% or less and particularly preferably 0.1% or less. The haze (Hz) is 0.01% or more at minimum.

In terms of yellowing resistance and stability (heat resistance, weather resistance, etc.), decahydro-1,4:5,8-dimethanonaphthalene diol (D-NDM) contained in the final pellets (polycarbonate resin composition containing additives) is preferably 30 ppm or less and more preferably 20 ppm or less.

Optical Lens

An optical lens of the present invention can be obtained by making the above-described polycarbonate resin composition of the present invention into a lens shape by injection molding with an injection molding machine or an injection compression molding machine. While molding conditions for injection molding are not particularly limited, molding temperature is preferably 180-280° C. Moreover, injection pressure is preferably 50-1700 kg/cm$^2$.

In order to prevent foreign matters from mixing into an optical lens as much as possible, the molding environment should certainly be a low dust environment, which is preferably Class 1000 or lower and more preferably Class 100 or lower.

The optical lens of the present invention is preferably used in a form of an aspheric lens according to usage. Since an aspherical lens is capable of correcting spherical aberration to be substantially zero with a single lens, there is no need of cancelling the spherical aberration with a combinational use of a plurality of spherical lenses, thereby realizing reduction in weight and production cost. Accordingly, an aspherical lens among various optical lenses is particularly useful as a camera lens. Astigmatism of the aspheric lens is preferably 0-15 mλ and more preferably 0-10 mλ.

While the thickness of the optical lens of the present invention can be determined within a wide range according to usage and is not particularly limited, it is preferably 0.01-30 mm and more preferably 0.1-15 mm. If necessary, the surface of the optical lens of the present invention may be provided with a coat layer such as an antireflection layer or a hard coat layer. The antireflection layer may be either a monolayer or a multilayer and either organic or inorganic, preferably inorganic. Specifically, examples include oxides or fluorides such as silicon oxide, aluminum oxide, zirconium oxide, titanium oxide, cerium oxide, magnesium oxide and magnesium fluoride. Among them, silicon oxide and zirconium oxide are favorable, and a combination of silicon oxide and zirconium oxide is more favorable. While the antireflection layer is not particularly limited as to the monolayer or the combination of multilayer, or the combination of their components, thickness and else, it preferably has a double- or triple-layer structure, particularly preferably a triple-layer structure. In addition, the thickness of the antireflection layer as a whole is preferably 0.00017-3.3% of the thickness of the optical lens, which is specifically 0.05-3 μm and particularly preferably 1-2 μm.

EXAMPLES

Hereinafter, the present invention will be described by way of examples, although the present invention should not be limited in any way to these examples. Now, values measured in the examples were obtained using following methods or apparatuses.

Weight-Average Molecular Weight (Mw) in Terms of Polystyrene

GPC was employed to generate a calibration curve, using tetrahydrofuran as a developing solvent and a standard polystyrene having a known molecular weight (molecular weight distribution=1). Based on this calibration curve, Mw were calculated from retention time of GPC.

Glass Transition Temperature (Tg)

A differential scanning calorimeter (DSC) was used for the measurement.

Refractive Index nD, Abbe Number vD

The polycarbonate resin composition was press molded into a 40φ disk with a thickness of 3 min (molding conditions: 200° C., 100 kgf/cm², 2 minutes) and cut out at right angle, which was subjected to measurement using KPR-200 from Kalnew.

Total Light Transmittance, Hue (YI), Haze (Hz)

Injection molding was carried out with an injection molding machine SH50 from Sumitomo Heavy Industries at a cylinder temperature of 260° C. and at a mold temperature that was lower than the glass transition temperature of the resin by 30° C., thereby obtaining a 3 mm-thick disk. This disk was used to measure total light transmittance, hue (YI) and haze (Hz).

Hue (YI) was measured using SE2000 from Nippon Denshoku Industries while total light transmittance and haze (Hz) were measured using NDH2000 from Nippon Denshoku Industries.

Measurements of Amounts of Phenol, Decahydro-1, 4:5,8-dimethanonaphthalene Dimethanol (D-NDM), 9,9-bis(4-(2-hydroxyethoxy)phenyl)fluorene (BPEF) and Diphenyl Carbonate (DPC) in Polycarbonate Resin Composition 0.5 g of a sample was dissolved in 50 ml of tetrahydrofuran (THF) to give a sample solution. A calibration curve was generated from a pure product of each compound as a standard product, and 2 μL of the sample solution was quantified by LC-MS under the following measurement conditions. The detection limit under these measurement conditions were 0.01 ppm.

LC-MS measurement conditions:
Measurement apparatus (LC part): Agilent Infinity 1260 LC System
Columns: ZORBAX Eclipse XDB-18 and guard cartridge
Mobile phases:
A: 0.01 mol/L-aqueous ammonium acetate solution
B: 0.01 mol/L-methanol solution of ammonium acetate
C: THF
Gradient program of mobile phases:

TABLE 1

| Time | Mobile phase composition (%) | | |
|---|---|---|---|
| (min) | A | B | C |
| 0 | 10 | 75 | 15 |
| 10 | 9 | 67.5 | 23.5 |
| 10.1 | 0 | 25 | 75 |
| 30 | 0 | 25 | 75 |

Flow rate: 0.3 ml/min
Column temperature: 45° C.
Detector: UV (225 nm)
Measurement apparatus (MS part): Agilent 6120 single quad LCMS System
Ionization source: ESI
Polarity: Positive and Negative
Fragmentor voltages: 100V (BPEF), 70V (phenol, DPC), 75V (D-NDM)
Dry gas: 10 L/min, 350° C.
Nebulizer: 50 psi
Capillary voltages: 3000V (Positive), 2500V (Negative)
Measured ions:

TABLE 2

| Monomer | Ion species | m/z |
|---|---|---|
| D-NDM | [M + NH4]+ | 240.2 |
| BPEF | [M + NH4]+ | 456.2 |
| Phenol | [M − H]− | 93.1 |
| DPC | [M − H]− | 213.2 |

Synthesis Example 1

Polymerization of Polycarbonate Made of D-1A:5,8-Dimethanonaphthalene Dimethanol (D-NDM)

23.50 kg (105.7 mol) of D-NDM represented by Formula (1a) below containing 2,6-isomer and 2,7-isomer at a mass ratio of 50:50, 22.98 kg (107.3 mol) of diphenyl carbonate, and 0.13 g ($1.5 \times 10^{-3}$ mol) of sodium hydrogen carbonate were placed in a 50 L reactor equipped with a stirrer and a distillation device, heated to 205° C. by spending an hour under a nitrogen atmosphere of 760 Torr, and stirred. The pressure was adjusted to 205 Torr by spending 30 minutes, and retained at 205 Torr at 205° C. for 30 minutes to initiate transesterification reaction. After 30 minutes, the pressure was reduced from 205 Torr to 180 Torr by spending 20 minutes. While reducing the pressure, the temperature was heated to 215° C. 120 minutes after the initiation of the reaction, the temperature was increased to 230° C. and the pressure was reduced to 150 Torr. 180 minutes after the initiation of the reaction, the temperature was increased to 240° C. and the pressure was reduced to 1 Torr, which was then retained for 20 minutes, thereby obtaining a polycarbonate resin.

The resulting polycarbonate resin had Mw of 30,000 and a glass transition temperature Tg of 133° C. This polycarbonate resin had a refractive index of 1.533, an Abbe number of 56.2, total light transmittance of 89%, hue (YI) of 2.5, and haze (Hz) of 0.3%.

In addition, the polycarbonate resin had a D-NDM content of 10 ppm, a phenol content of 210 ppm, and a DPC content of 35 ppm. The results are summarized in Table 3 below.

(1a)

Synthesis Example 2

Polymerization of Polycarbonate Made of 9,9-bis(4-(2-hydroxyethoxy)phenyl)fluorene (BPEF)

20.0 kg (45.6 mol) of BPEF represented by the following structural formula, 10.16 kg (47.4 mol) of diphenyl carbonate, and 0.03 g ($3.6 \times 10^{-4}$ mol) of sodium hydrogen carbonate were placed in a 50 L reactor equipped with a stirrer and a distillation device, heated to 205° C. by spending an hour under a nitrogen atmosphere of 760 Torr, and stirred. The pressure was adjusted to 205 Torr by spending 20 minutes, and retained at 205 Torr at 205° C. for 30 minutes to initiate transesterification reaction. After 30 minutes, the pressure was reduced from 205 Torr to 180 Torr by spending 20 minutes. While reducing the pressure, the temperature was heated to 215° C. 120 minutes after the initiation of the reaction, the temperature was increased to 230° C. and the pressure was reduced to 150 Torr. 180 minutes after the initiation of the reaction, the temperature was increased to 240° C. and the pressure was reduced to 1 Torr, which was then retained for 20 minutes, thereby obtaining a polycarbonate resin.

The resulting polycarbonate resin had Mw of 27,000 and a glass transition temperature Tg of 143° C. This polycarbonate resin had a refractive index of 1.639, an Abbe number of 23.5, total light transmittance of 89%, hue (YI) of 3.0, and haze (Hz) of 0.3%.

In addition, the polycarbonate resin had a phenol content of 210 ppm, a DPC content of 250 ppm, and a BPEF content of 30 ppm. The results are summarized in Table 3 below.

BPEF

Synthesis Example 3

Polymerization of polycarbonate made of 9,9-bis(4-(2-hydroxyethoxy)-3-phenylphenyl)fluorene (BPPEF)

20.0 kg (33.9 mol) of BPEF represented by the following structural formula, 7.47 kg (34.9 mol) of diphenyl carbonate, and 0.025 g ($3.0 \times 10^4$ mol) of sodium hydrogen carbonate were placed in a 50 L reactor equipped with a stirrer and a distillation device, heated to 205° C. by spending an hour under a nitrogen atmosphere of 760 Torr, and stirred. The pressure was adjusted to 205 Torr by spending 20 minutes, and retained at 205 Torr at 205° C. for 30 minutes to initiate transesterification reaction. After 30 minutes, the pressure was reduced from 205 Torr to 180 Torr by spending 20 minutes. While reducing the pressure, the temperature was heated to 215° C. 120 minutes after the initiation of the reaction, the temperature was increased to 230° C. and the pressure was reduced to 150 Torr. 180 minutes after the initiation of the reaction, the temperature was increased to 240° C. and the pressure was reduced to 1 Torr, which was then retained for 20 minutes, thereby obtaining a polycarbonate resin.

The resulting polycarbonate resin had Mw of 40,000 and a glass transition temperature Tg of 155° C. This polycarbonate resin had a refractive index of 1.657, an Abbe number of 21.2, total light transmittance of 88%, hue (YI) of 3.0, and haze (Hz) of 0.3%.

In addition, the polycarbonate resin had a phenol content of 270 ppm, and a DPC content of 100 ppm. The results are summarized in Table 3 below.

BPPEF

Synthesis Example 4

Polymerization of Polycarbonate Made of Penta-Cyclopentadecane Dimethanol (PCPMD)

A polycarbonate resin was obtained by carrying out a reaction in the same manner as Synthesis example 1 except that the monomer as the raw material was changed to 15.0 kg (57.2 mol) of penta-cyclopentadecane dimethanol represented by the following structural formula.

The resulting polycarbonate resin had Mw of 32,000 and a glass transition temperature Tg of 137° C. This polycarbonate resin had a refractive index of 1.537, an Abbe number of 56.6, total light transmittance of 89%, hue (YI) of 3.1, and haze (Hz) of 0.3%.

In addition, the polycarbonate resin had a phenol content of 250 ppm, and a DPC content of 80 ppm. The results are summarized in Table 3 below.

(1)

Synthesis Example 5

Polymerization of Polycarbonate Made of Bisphenol A (BPA)

20.0 kg (87.6 mol) of BPA, 19.3 kg (90.2 mol) of diphenyl carbonate and 0.03 g ($3.6 \times 10^{-4}$ mol) of sodium hydrogen carbonate were placed in a 50 L reactor equipped with a stirrer and a distillation device, heated to 205° C. by spending an hour under a nitrogen atmosphere of 760 Torr, and stirred. The pressure was adjusted to 205 Torr by spending 20 minutes, and retained at 205 Torr at 205° C. for 30 minutes to initiate transesterification reaction. After 30 minutes, the pressure was reduced from 205 Torr to 180 Torr by spending 20 minutes. While reducing the pressure, the temperature was heated to 215° C. 120 minutes after the initiation of the reaction, the temperature was increased to 230° C. and the pressure was reduced to 150 Torr. 180 minutes after the initiation of the reaction, the temperature was increased to 240° C. and the pressure was reduced to 1 Torr, which was then retained for 20 minutes, thereby obtaining a polycarbonate resin.

The resulting polycarbonate resin had Mw of 33,000 and a glass transition temperature Tg of 145° C. This polycarbonate resin had a refractive index of 1.582, an Abbe number of 30, total light transmittance of 89%, hue (YI) of 2.3, and haze (Hz) of 0.3%.

In addition, the polycarbonate resin had a phenol content of 300 ppm, and a DPC content of 100 ppm. The results are summarized in Table 3 below.

Synthesis Example 6

Polymerization of Polycarbonate Made of Decahydro-1,4:5,8-Dimethanonaphthalene Dimethanol (D-NDM)

A polycarbonate resin was obtained by carrying out a reaction in the same manner as Synthesis example 1 except that the amount of sodium hydrogen carbonate was changed to 0.01 g ($1.2 \times 10^{-4}$ mol).

The resulting polycarbonate resin had Mw of 30,000 and a glass transition temperature Tg of 133° C. This polycarbonate resin had a refractive index of 1.533, an Abbe number of 56.2, total light transmittance of 89%, hue (YI) of 2.5, and haze (Hz) of 0.3%.

In addition, the polycarbonate resin had a D-NDM content of 15 ppm, a phenol content of 220 ppm, and a DPC content of 40 ppm. The results are summarized in Table 3 below.

Example 1

Pellets of 10.0 kg of the polycarbonate resin obtained in Synthesis example 1 by using D-NDM as a raw material and 4.8 kg of the polycarbonate resin obtained in Synthesis example 2 by using BPEF as a raw material were mixed, to which 14.8 g of a hindered phenol-based antioxidant (AO-60 from ADEKA), 4.4 g of a phosphite-based antioxidant (trade name: PEP-36) and 14.8 g of glycerol monostearate (S-100A from Riken Vitamin) as a mold release agent were added. The resultant was kneaded with a twin-screw extruder (IPEC-35) for pelletization. The pellets of the resulting polycarbonate resin composition were colorless and transparent, and their physical properties were measured to be Mw of 28,000, Tg of 137° C., a refractive index (nd) of 1.567, an Abbe number (vd) of 38, total light transmittance of 89%, hue (YI) of 2.5, and haze (Hz) of 0.2%.

In addition, the polycarbonate composition had a D-NDM content of 15 ppm, a phenol content of 130 ppm, a DPC content of 170 ppm and a BPEF content of 20 ppm. The results are summarized in Table 4.

Figure 1:
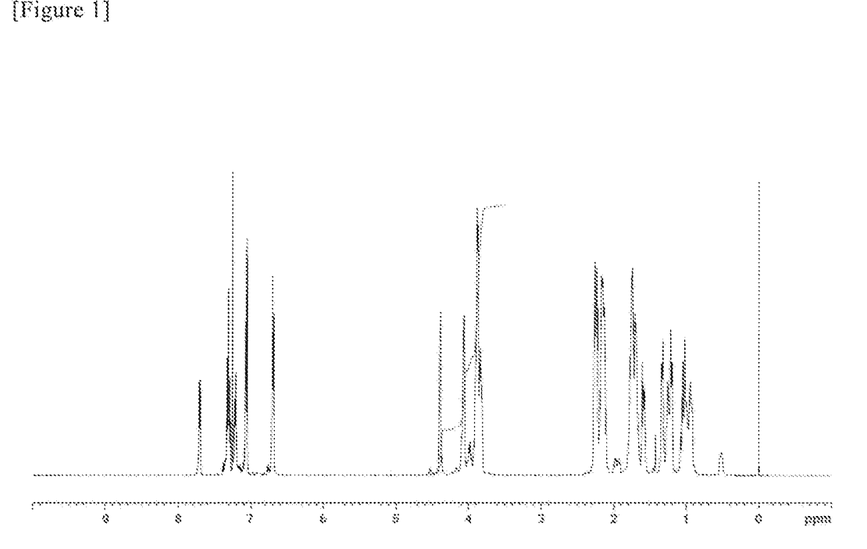
FIG. 1 A diagram showing the result of $^1$H-NMR measurement of a polycarbonate resin composition obtained in Example 1.
Figure 2:
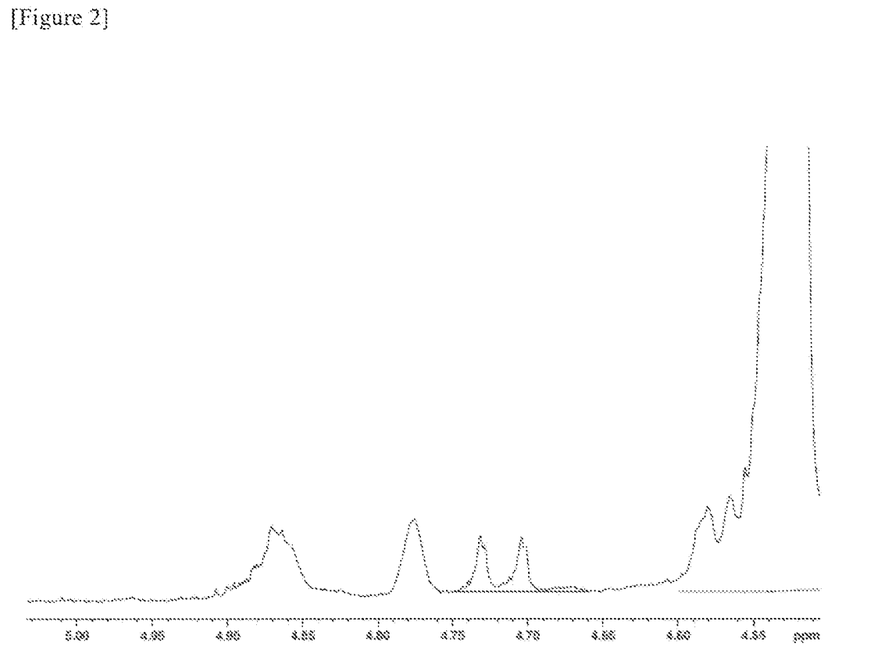
FIG. 2 An enlarged view of FIG. 1.

The results of $^1$H-NMR measurement of the polycarbonate resin composition obtained in Example 1 are shown in FIGS. 1 and 2.

The following data were read from the acquired $^1$H-NMR chart.

|  | Chemical shift | Integral value |
| --- | --- | --- |
| Standard (ethylene chain) | 4.60-3.50 ppm | 100 |
| Vinyl group (from BPEF) | 4.75-4.66 ppm | 0.052 |

The above-mentioned vinyl groups refer to Hf and Ho in the following structural formula.

If Y in General formula (2) of the present invention is a $C_2$ alkylene group, a preferable amount of the fluorene-based terminal vinyl groups is preferably such that "(Peak integral value at 4.60-3.50 ppm)/(Peak integral value at 4.75-4.66 ppm)×100" is preferably 0.001-1.0, more preferably 0.010-0.5 and particularly preferably 0.010-0.1.

Example 2

A polycarbonate resin composition was obtained in the same manner as Example 1 except that 5.0 kg of the polycarbonate resin obtained in Synthesis example 1 using D-NDM as a raw material, and 0.9 kg of the polycarbonate resin obtained in Synthesis example 2 using BPEF as a raw material were used. The pellets of the resulting polycarbonate resin composition were colorless and transparent, and their physical properties were measured to be Mw of 25,000, Tg of 136° C., a refractive index (nd) of 1.547, an Abbe number (vd) of 45, total light transmittance of 89%, hue (YI) of 2.3, and haze (Hz) of 0.3%.

In addition, the polycarbonate composition had a D-NDM content of 15 ppm, a phenol content of 250 ppm, a DPC content of 180 ppm, and a BPEF content of 20 ppm. The results are summarized in Table 4.

Example 3

A polycarbonate resin composition was obtained in the same manner as Example 1 except that 3.0 kg of the polycarbonate resin obtained in Synthesis example 1 using D-NDM as a raw material, and 3.0 kg of the polycarbonate resin obtained in Synthesis example 2 using BPEF as a raw material were used. The pellets of the resulting polycarbonate resin composition were colorless and transparent, and their physical properties were measured to be Mw of 29,000, Tg of 140° C., a refractive index (nd) of 1.583, an Abbe number (vd) of 33, total light transmittance of 89%, hue (YI) of 2.9, and haze (Hz) of 0.3%.

In addition, the polycarbonate composition had a D-NDM content of 15 ppm, a phenol content of 250 ppm, a DPC content of 180 ppm, and a BPEF content of 20 ppm. The results are summarized in Table 4.

Example 4

A polycarbonate resin composition was obtained in the same manner as Example 1 except that 3.2 kg of the polycarbonate resin obtained in Synthesis example 1 using D-NDM as a raw material, and 6.8 kg of the polycarbonate resin obtained in Synthesis example 2 using BPEF as a raw material were used. The pellets of the resulting polycarbonate resin composition were colorless and transparent, and their physical properties were measured to be Mw of 28,000, Tg of 141° C., a refractive index (nd) of 1.603, an Abbe number (vd) of 29, total light transmittance of 89%, hue (YI) of 3.2, and haze (Hz) of 0.3%.

In addition, the polycarbonate composition had a D-NDM content of 15 ppm, a phenol content of 280 ppm, a DPC content of 200 ppm, and a BPEF content of 20 ppm. The results are summarized in Table 4.

Example 5

A polycarbonate resin composition was obtained in the same manner as Example 1 except that 10.0 kg of the polycarbonate resin obtained in Synthesis example 1 using D-NDM as a raw material, and 4.8 kg of the polycarbonate resin obtained in Synthesis example 3 using BPPEF as a raw material were used. The pellets of the resulting polycarbonate resin composition were colorless and transparent, and their physical properties were measured to be Mw of 29,000, Tg of 141° C., a refractive index (nd) of 1.570, an Abbe number (vd) of 36, total light transmittance of 88%, hue (YI) of 5.6, and haze (Hz) of 0.3%.

In addition, the polycarbonate composition had a D-NDM content of 15 ppm, a phenol content of 290 ppm, and a DPC content of 190 ppm. The results are summarized in Table 4.

Example 6

Kneading and pelletization were performed in the same manner as Example 1 except that the polycarbonate resin obtained in Synthesis example 6 using D-NDM as a raw material was used instead of the polycarbonate resin obtained in Synthesis example 1. The pellets of the resulting polycarbonate resin composition were colorless and transparent, and their physical properties were measured to be Mw of 28,000, Tg of 137° C., a refractive index (nd) of 1.567, an Abbe number (vd) of 38, total light transmittance of 89%, hue (YI) of 2.6, and haze (Hz) of 0.4%.

In addition, the polycarbonate composition had a D-NDM content of 15 ppm, a phenol content of 135 ppm, a DPC content of 175 ppm, and a BPEF content of 20 ppm. The results are summarized in Table 4.

Comparative Example 1

10 kg (45.0 mol) of D-NDM, 4.8 kg (10.9 mol) of BPEF, 12.4 kg (57.9 mol) of diphenyl carbonate and 0.05 g ($6.7 \times 10^{-4}$ mol) of sodium hydrogen carbonate were placed in a 50 L reactor equipped with a stirrer and a distillation device, heated to 205° C. by spending an hour under a nitrogen atmosphere of 760 Torr, and stirred. The pressure was adjusted to 205 Torr by spending 20 minutes, and retained at 205 Torr at 205° C. for 30 minutes to initiate transesterification reaction. After 30 minutes, the pressure was reduced from 205 Torr to 180 Torr by spending 20 minutes. While reducing the pressure, the temperature was heated to 215° C. 120 minutes after the initiation of the reaction, the temperature was increased to 230° C. and the pressure was reduced to 150 Torr. 180 minutes after the initiation of the reaction, the temperature was increased to 240° C. and the pressure was reduced to 1 Torr, which was then retained for 20 minutes, thereby obtaining a polycarbonate copolymer.

To the resulting polycarbonate copolymer, 14.8 g of a hindered phenol-based antioxidant (AO-60 from ADEKA), 4.4 g of a phosphite-based antioxidant (trade name: PEP-36) and 14.8 g of glycerol monostearate (S-100A from Riken Vitamin) as a mold release agent were added. The resultant was kneaded with a twin-screw extruder (IPEC-35) for pelletization. The physical properties of the resulting polycarbonate resin composition were measured to be Mw of 27,000, Tg of 137° C., a refractive index (nd) of 1.566, an Abbe number (vd) of 38, total light transmittance of 87%, hue (YI) of 6.0, and haze (Hz) of 0.5%.

In addition, the polycarbonate composition had a D-NDM content of 15 ppm, a phenol content of 320 ppm, a DPC content of 220 ppm, and a BPEF content of 20 ppm. The results are summarized in Table 5 below.

Comparative Example 2

Kneading was performed in the same manner as Example 1 except that 10.0 kg of the polycarbonate resin obtained in Synthesis example 4 using PCPDM as a raw material and 4.8 kg of the polycarbonate resin obtained in Synthesis example 2 using BPEF as a raw material were used, but they were not uniformly compatible.

Comparative Example 3

Kneading was performed in the same manner as Example 1 except that 10.0 kg of the polycarbonate resin obtained in Synthesis example 1 using D-NDM as a raw material and 4.8 kg of the polycarbonate resin obtained in Synthesis example 5 using BPA as a raw material were used. The physical properties of the resulting polycarbonate resin composition were measured to be Mw of 28,000, Tg of 138° C., a refractive index (nd) of 1.547, an Abbe number (vd) of 43, total light transmittance of 87%, hue (YI) of 3.0, and haze (Hz) of 0.7%. The results are summarized in Table 6 below.

TABLE 3

|  | Synthesis example 1 | Synthesis example 2 | Synthesis example 3 | Synthesis example 4 | Synthesis example 5 | Synthesis example 6 |
| --- | --- | --- | --- | --- | --- | --- |
| D-NDM-PC (mass %) | 100 | — | — | — | — | 100 |
| BPEF-PC (mass %) | — | 100 | — | — | — | — |
| BPPEF-PC (mass %) | — | — | 100 | — | — | — |
| PCPDM-PC (mass %) | — | — | — | 100 | — | — |
| BPA-PC (mass %) | — | — | — | — | 100 | — |
| Mw | 30000 | 27000 | 40000 | 32000 | 33000 | 30000 |
| Tg (° C.) | 133 | 143 | 155 | 137 | 145 | 133 |
| Refractive index nD | 1.533 | 1.639 | 1.657 | 1.537 | 1.582 | 1.533 |
| Abbe number vD | 56.2 | 23.5 | 21.2 | 56.6 | 30 | 56.2 |
| Total light transmittance (%) | 89 | 89 | 88 | 89 | 89 | 89 |
| YI | 2.5 | 3.0 | 3.0 | 3.1 | 2.3 | 2.5 |
| Hz (%) | 0.3 | 0.3 | 0.3 | 0.3 | 0.3 | 0.3 |
| D-NDM (ppm) | 10 | — | — | — | — | 15 |
| Phenol (ppm) | 210 | 210 | 270 | 250 | 300 | 220 |
| DPC (pppm) | 35 | 250 | 100 | 80 | 100 | 40 |
| BPEF (ppm) | — | 30 | — | — | — | — |

D-NDM: Decahydro-1,4:5,8-dimethanonaphthalene dimethanol
BPEF: 9,9-Bis(4-(2-hydroxyethoxy)phenyl)fluorene
BPPEF: 9,9-Bis(4-(2-hydroxyethoxy)-3-phenylphenyl)fluorene
PCPDM: Penta-cyclopentadecane dimethanol
BPA: Bisphenol A

TABLE 4

|  | Example 1 Mixed | Example 2 Mixed | Example 3 Mixed | Example 4 Mixed | Example 5 Mixed | Example 6 Mixed |
| --- | --- | --- | --- | --- | --- | --- |
| D-NDM-PC (kg) | 10.0 | 5.0 | 3.0 | 3.2 | 10.0 | 10.0 |
| BPEF-PC (kg) | 4.8 | 0.9 | 3.0 | 6.8 | — | 4.8 |
| BPPEF-PC (kg) | — | — | — | — | 4.8 | — |
| D-NDM-PC (mass %) | 68 | 85 | 50 | 32 | 68 | 68 |
| BPEF-PC (mass %) | 32 | 15 | 50 | 68 | — | 32 |
| BPPEF-PC (mass%) | — | — | — | — | 32 | — |
| Mw | 28000 | 25000 | 29000 | 28000 | 29000 | 28000 |
| Tg (° C.) | 137 | 136 | 140 | 141 | 141 | 137 |
| Refractive index nD | 1.567 | 1.547 | 1.583 | 1.603 | 1.570 | 1.567 |
| Abbe number vD | 38 | 45 | 33 | 29 | 36 | 38 |
| Total light transmittance (%) | 89 | 89 | 89 | 89 | 88 | 89 |
| YI | 2.5 | 2.3 | 2.9 | 3.2 | 5.6 | 2.6 |
| Hz (%) | 0.2 | 0.3 | 0.3 | 0.3 | 0.3 | 0.4 |
| D-NDM (ppm) | 15 | 15 | 15 | 15 | 15 | 15 |
| Phenol (ppm) | 130 | 250 | 250 | 280 | 290 | 135 |
| DPC (pppm) | 170 | 180 | 180 | 200 | 190 | 175 |
| BPEF (ppm) | 20 | 20 | 20 | 20 | 0 | 20 |

TABLE 5

|  | Comparative example 1 Copolymerization |
| --- | --- |
| D-NDM (kg) | 10.0 |
| BPEF (kg) | 4.8 |
| D-NDM (mass %) | 68 |
| BPEF (mass %) | 32 |
| Mw | 27000 |
| Tg (° C.) | 137 |
| Refractive index nD | 1.566 |
| Abbe number vD | 38 |
| Total light transmittance (%) | 87 |
| YI | 6.0 |
| Hz (%) | 0.5 |
| D-NDM (ppm) | 15 |
| Phenol (ppm) | 320 |
| DPC (pppm) | 220 |
| BPEF (ppm) | 20 |

TABLE 6

|  | Comparative example 2 Mixed | Comparative example 3 Mixed |
| --- | --- | --- |
| D-NDM-PC (kg) | — | 10.0 |
| PCPDM-PC (kg) | 10.0 | — |
| BPEF-PC (kg) | 4.8 | — |
| BPA-PC (kg) | — | 4.8 |
| D-NDM-PC (mass %) | — | 68 |
| PCPDM-PC (mass %) | 68 | — |
| BPEF-PC (mass %) | 32 | — |
| BPA-PC (mass %) | — | 32 |
| Mw | Unmeasurable due to incompatibility | 28000 |
| Tg (° C.) |  | 138 |
| Refractive index nD |  | 1.547 |
| Abbe number Nd |  | 43 |
| Total light transmittance (%) |  | 87 |
| YI |  | 3.0 |
| Hz (%) |  | 0.7 |

INDUSTRIAL APPLICABILITY

The polycarbonate resin composition of the present invention can favorably be used as a camera lens for smartphones, DSC, dashboard cameras and the like. Moreover, the polycarbonate resin composition of the present invention can be used in expectation of reduction in the thickness of lens units used for telescopes and the like.

The invention claimed is:

1. A polycarbonate resin composition comprising a polycarbonate resin (A) having a structural unit represented by General formula (1) below and a polycarbonate resin (B) having a structural unit represented by General formula (2) below:

(1)

(in General formula (1), R represents a hydrogen atom or a $C_1$-$C_4$ alkyl group)

(2)

(in General formula (2), $R^1$ and $R^2$ each independently represent a hydrogen atom, a $C_1$-$C_{20}$ alkyl group, a $C_1$-$C_{20}$ alkoxyl group, a $C_5$-$C_{20}$ cycloalkyl group, a $C_5$-$C_{20}$ cycloalkoxyl group, a $C_6$-$C_{20}$ aryl group or a $C_6$-$C_{20}$ aryloxy group, and Y represents a $C_1$-$C_4$ alkylene group).

2. The polycarbonate resin composition according to claim 1, wherein $R^1$ and $R^2$ in General formula (2) each independently represent a hydrogen atom or a phenyl group.

3. The polycarbonate resin composition according to claim 1, wherein the polycarbonate resin (A) and the polycarbonate resin (B) are made to be compatible with each other.

4. The polycarbonate resin composition according to claim 1, wherein a haze is 0.4% or less when measured with a thickness of 3 mm.

5. The polycarbonate resin composition according to claim 1, wherein the polycarbonate resin (A) comprises a structural unit derived from a 2,6-isomer represented by a structural formula below and a structural unit derived from a 2,7-isomer represented by a structural formula below 2,6-Isomer 2,7-Isomer 6. The polycarbonate resin composition according to claim 5, wherein the polycarbonate resin (A) comprises the structural unit derived from the 2,6-isomer and the structural unit derived from the 2,7-isomer at a mass ratio of 1.0:99.0 to 99.0:1.0.

7. The polycarbonate resin composition according to claim 1, wherein R in General formula (1) represents a hydrogen atom.

8. The polycarbonate resin composition according to claim 1, wherein the mixed ratio of the polycarbonate resin (A) and the polycarbonate resin (B) is 90:10 to 10:90 at a mass ratio.

9. An optical lens using the polycarbonate resin composition according to claim 1.

* * * * *